United States Patent
Liu et al.

(10) Patent No.: US 7,229,564 B2
(45) Date of Patent: Jun. 12, 2007

(54) METHOD FOR MANUFACTURING BIPOLAR PLATE AND DIRECT METHANOL FUEL CELL

(75) Inventors: Yung-Yi Liu, Taipei Hsien (TW); James Shang, Taoyuan (TW)

(73) Assignee: Nan Ya Printed Circuit Board Corporation, Luchu, Taoyuan (TW)

( * ) Notice: Subject to any disclaimer, the term of this patent is extended or adjusted under 35 U.S.C. 154(b) by 0 days.

(21) Appl. No.: 10/908,551

(22) Filed: May 16, 2005

(65) Prior Publication Data

US 2006/0043061 A1    Mar. 2, 2006

(30) Foreign Application Priority Data

Sep. 1, 2004    (TW) .............. 93126384 A

(51) Int. Cl.
C23F 1/00 (2006.01)

(52) U.S. Cl. .............. 216/20; 216/33; 216/36; 216/49; 216/56

(58) Field of Classification Search ............ None
See application file for complete search history.

(56) References Cited

U.S. PATENT DOCUMENTS

| | | | | |
|---|---|---|---|---|
| 4,499,663 A * | 2/1985 | Zwick et al. | .......... | 29/623.1 |
| 4,799,936 A * | 1/1989 | Riley | .......... | 29/623.1 |
| 5,290,642 A * | 3/1994 | Minh et al. | .......... | 429/33 |
| 5,330,859 A * | 7/1994 | McPheeters et al. | .......... | 429/33 |
| 5,770,326 A * | 6/1998 | Limaye | .......... | 429/30 |
| 5,980,813 A * | 11/1999 | Narang et al. | .......... | 264/401 |
| 6,312,846 B1 * | 11/2001 | Marsh | .......... | 429/30 |
| 6,379,476 B1 * | 4/2002 | Tarutani et al. | .......... | 148/325 |
| 6,608,617 B2 * | 8/2003 | Hoffknecht et al. | .......... | 345/173 |
| 6,838,203 B2 * | 1/2005 | Zheng | .......... | 429/31 |
| 6,955,861 B2 * | 10/2005 | Yoshizawa et al. | .......... | 429/26 |
| 2002/0110720 A1 * | 8/2002 | Yang | .......... | 429/35 |
| 2002/0150804 A1 * | 10/2002 | Srinivasan et al. | .......... | 429/32 |
| 2004/0048132 A1 * | 3/2004 | Takai et al. | .......... | 429/34 |
| 2004/0086762 A1 * | 5/2004 | Maeda et al. | .......... | 429/32 |
| 2004/0131904 A1 * | 7/2004 | Arthur et al. | .......... | 429/26 |
| 2004/0137308 A1 * | 7/2004 | Maeda et al. | .......... | 429/38 |
| 2004/0146772 A1 * | 7/2004 | Miyao et al. | .......... | 429/38 |
| 2004/0166393 A1 * | 8/2004 | Akita et al. | .......... | 429/38 |
| 2004/0185323 A1 * | 9/2004 | Fowler et al. | .......... | 429/38 |
| 2005/0016839 A1 * | 1/2005 | Horne et al. | .......... | 204/242 |
| 2005/0026026 A1 * | 2/2005 | Yen et al. | .......... | 429/36 |
| 2005/0075406 A1 * | 4/2005 | Miyake et al. | .......... | 521/27 |
| 2005/0158608 A1 * | 7/2005 | Shu et al. | .......... | 429/34 |
| 2005/0172482 A1 * | 8/2005 | Morishima et al. | .......... | 29/730 |
| 2005/0202297 A1 * | 9/2005 | Schmitz et al. | .......... | 429/32 |
| 2005/0202305 A1 * | 9/2005 | Markoski et al. | .......... | 429/38 |
| 2005/0214621 A1 * | 9/2005 | Liu et al. | .......... | 429/38 |
| 2005/0244703 A1 * | 11/2005 | Osenar et al. | .......... | 429/35 |
| 2005/0249917 A1 * | 11/2005 | Trentacosta et al. | .......... | 428/137 |
| 2005/0250004 A1 * | 11/2005 | McLean et al. | .......... | 429/122 |
| 2005/0260473 A1 * | 11/2005 | Wang | .......... | 429/33 |
| 2005/0260478 A1 * | 11/2005 | Mino et al. | .......... | 429/34 |
| 2006/0019129 A1 * | 1/2006 | Liu et al. | .......... | 429/12 |
| 2006/0040169 A1 * | 2/2006 | Liu et al. | .......... | 429/44 |
| 2006/0040170 A1 * | 2/2006 | Liu et al. | .......... | 429/44 |

* cited by examiner

*Primary Examiner*—Allan Olsen
(74) *Attorney, Agent, or Firm*—Winston Hsu

(57) ABSTRACT

A DMFC (direct methanol fuel cell) includes two bipolar plates, a membrane electrode assembly, a bonding layer, and a fuel container base. The bipolar plate is a releasable substrate that includes a releasable copper carrier, a release layer, and a metal foil. The bipolar/MEA assembly is formed by laminating the releasable bipolar, the MEA, and the bonding sheet, peeling off the release carrier, and printing a carbon ink or plating Au.

5 Claims, 12 Drawing Sheets

METHOD FOR MANUFACTURING BIPOLAR PLATE AND DIRECT METHANOL FUEL CELL

BACKGROUND OF INVENTION

1. Field of the Invention

The present invention relates to a direct methanol fuel cell (DMFC), and more particularly, to a method for fabricating a releasable bipolar of the DMFC.

2. Description of the Prior Art

A fuel cell is an electrochemical cell in which a free energy change resulting from a fuel oxidation reaction is converted into electrical energy. Fuel cells utilizing methanol as fuel are typically called Direct Methanol Fuel Cells (DMFCs), which generate electricity by combining gaseous or aqueous methanol with air. DMFC technology has become widely accepted as a viable fuel cell technology that offers itself to many application fields such as electronic apparatuses, vehicles, military equipment, the aerospace industry, and so on.

DMFCs, like ordinary batteries, provide DC electricity from two electrochemical reactions. These reactions occur at electrodes (or poles) to which reactants are continuously fed. The negative electrode (anode) is maintained by supplying methanol, whereas the positive electrode (cathode) is maintained by the supply of air. When providing current, methanol is electrochemically oxidized at the anode electrocatalyst to produce electrons, which travel through the external circuit to the cathode electrocatalyst where they are consumed together with oxygen in a reduction reaction. The circuit is maintained within the cell by the conduction of protons in the electrolyte. One molecule of methanol ($CH_3OH$) and one molecule of water ($H_2O$) together store six atoms of hydrogen. When fed as a mixture into a DMFC, they react to generate one molecule of $CO_2$, 6 protons ($H+$), and 6 electrons to generate a flow of electric current. The protons and electrons generated by methanol and water react with oxygen to generate water.

FIG. 1 and FIG. 2 illustrate a conventional DMFC 10, wherein FIG. 1 is a plain view of a conventional DMFC 10 and FIG. 2 is a cross-sectional view of the conventional DMFC 10 along line I-I of FIG. 1. As shown in FIG. 1 and FIG. 2, the conventional DMFC 10 comprises a bipolar plate assembly 12 and a fuel container 14. The bipolar plate assembly 12 comprises an upper frame 51, lower frame 52, a cathode wire lath 121, a plurality of bended bipolar wire laths 122, 123, 124, 125, an anode wire lath 126, and membrane electrode assemblies (MEAs) 131, 132, 133, 134, 135 interposed between corresponding wire laths.

However, the above-described conventional DMFC 10 has several drawbacks. First, the bipolar plate assembly 12 is too thick and thus too unwieldy to carry. Furthermore, as mentioned, the cost of producing the conventional DMFC 10 is high since the cathode wire lath 121, bended bipolar wire laths 122, 123, 124, 125, and the anode wire lath 126 are titanium meshes treated by gold plating. In addition, the throughput of the conventional DMFC 10 is low because the bipolar wire laths 122, 123, 124, 125 are bended manually before mounting on the upper and lower frames. In light of the above, there is a need to provide a thin, inexpensive, and highly integrated DMFC that is capable of achieving the scale of mass production.

SUMMARY OF INVENTION

It is therefore an objective of the present invention to provide a method for fabricating a direct methanol fuel cell and bipolar plate for solving the problems caused by using conventional methods.

According to the present invention, the method for fabricating a DMFC (direct methanol fuel cell) includes the following steps: First, a bipolar plate is fabricated by providing a substrate, which further comprises a releasable copper carrier, a release layer, and a metal foil, in which the release layer functions to bind the releasable copper carrier and the metal foil together and secondly, and by utilizing a photoresist for defining an electrode plate area on the metal foil. Next, a copper etching process is performed on the substrate for etching the area of the metal foil not covered by the photoresist and exposing the electrode plate area. After the photoresist is removed, a first protective layer is disposed on the electrode plate area. Next, at least one bonding sheet and at least one membrane electrode assembly (MEA) and two bipolar plates are provided and a laminating process is performed for binding the bipolar plates and the MEA together. Then, the releasable copper carrier and the release layer are removed for exposing the surface of the electrode plate area. Next, a second protective layer is partially disposed on the electrode plate area for forming a bipolar/MEA assembly and finally, and the bipolar/MEA assembly is laminated together with a fuel container base.

These and other objectives of the present invention will no doubt become obvious to those of ordinary skill in the art after reading the following detailed description of the preferred embodiment that is illustrated in the various figures and drawings.

DETAILED DESCRIPTION

Please refer to FIG. 3 to FIG. 7. FIG. 3 to FIG. 7 are diagrams showing the method for fabricating a bipolar plate 300 of a DMFC according to the present invention.

Figure 1:
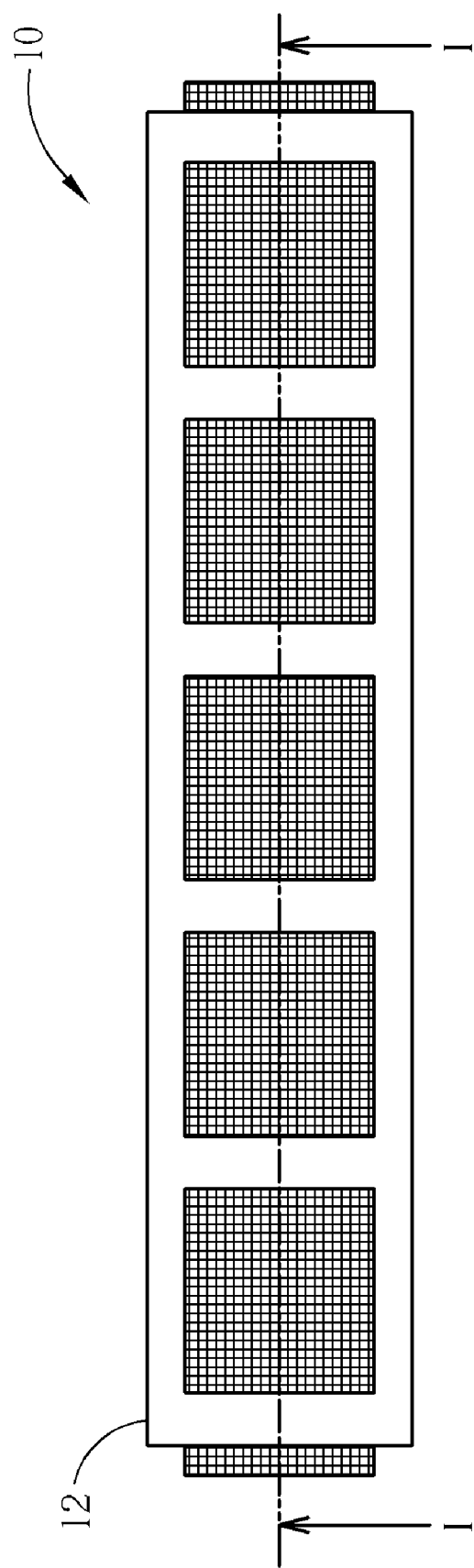
FIG. 1 is a plain view of a conventional DMFC.
Figure 2:
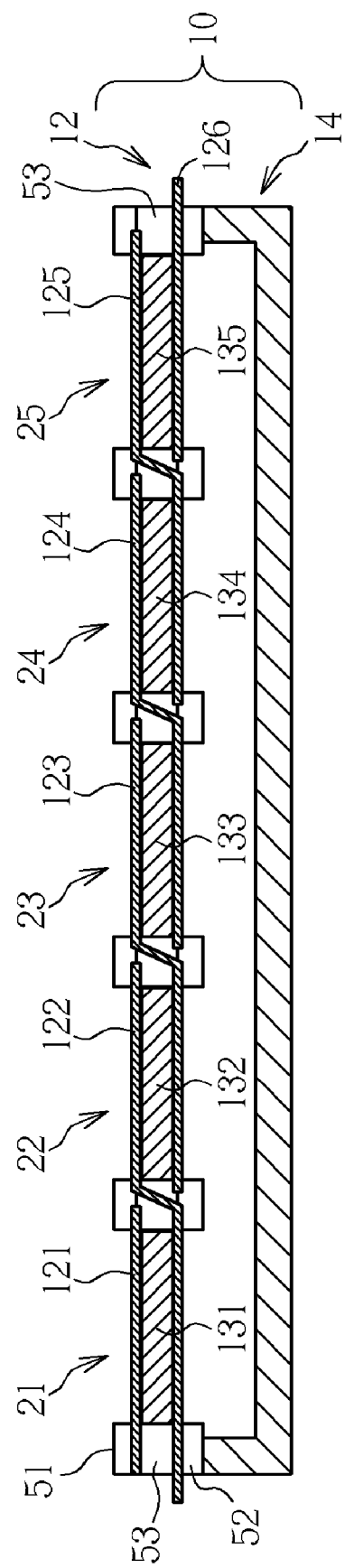
FIG. 2 is a cross-sectional view of the conventional DMFC along the cross-section line I-I of FIG. 1.
Figure 3:
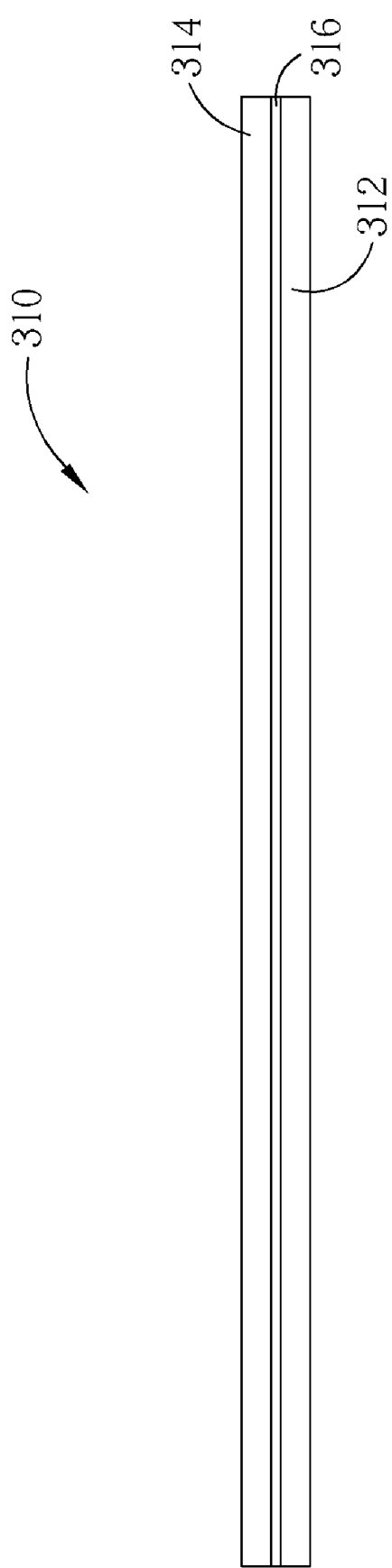
FIG. 3 to FIG. 7 are diagrams showing the method for fabricating a bipolar plate of a DMFC according to the present invention.
Figure 4:
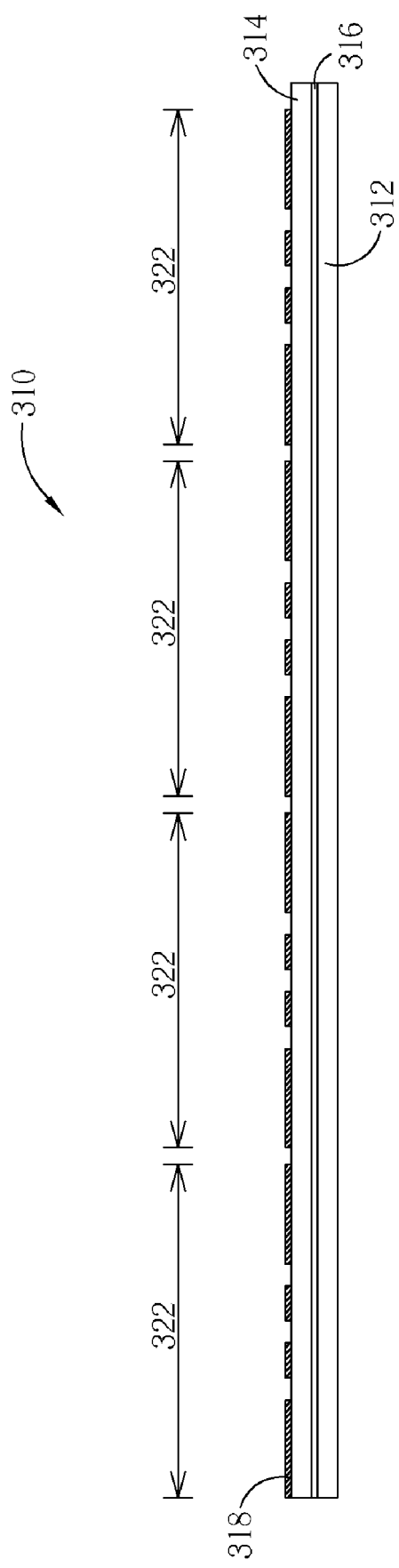
Figure 5:
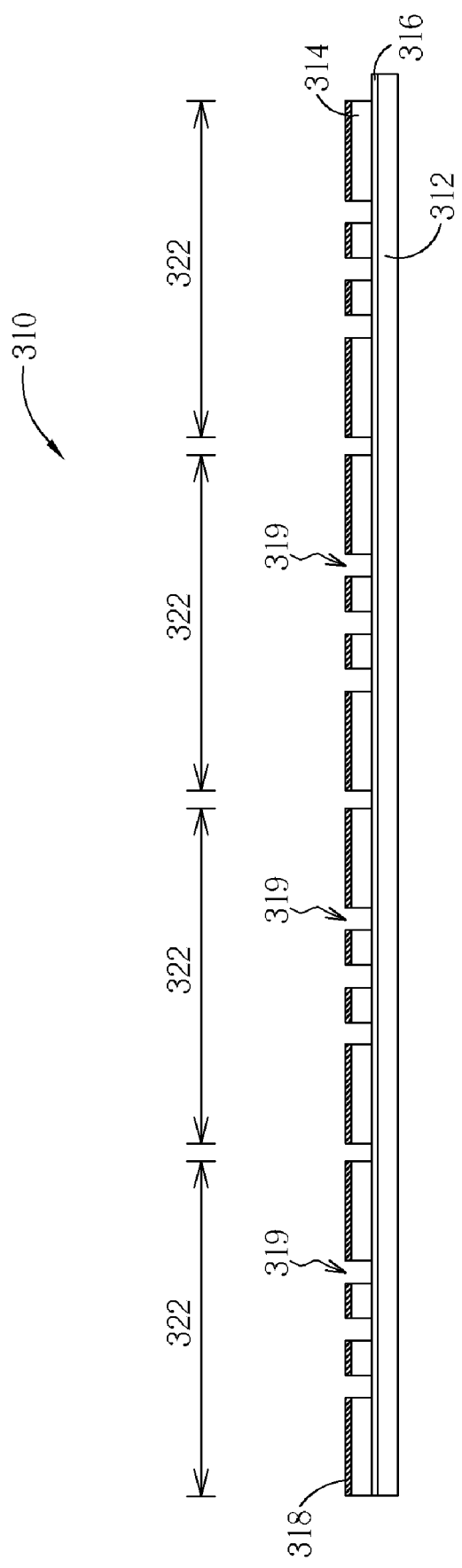
Figure 6:
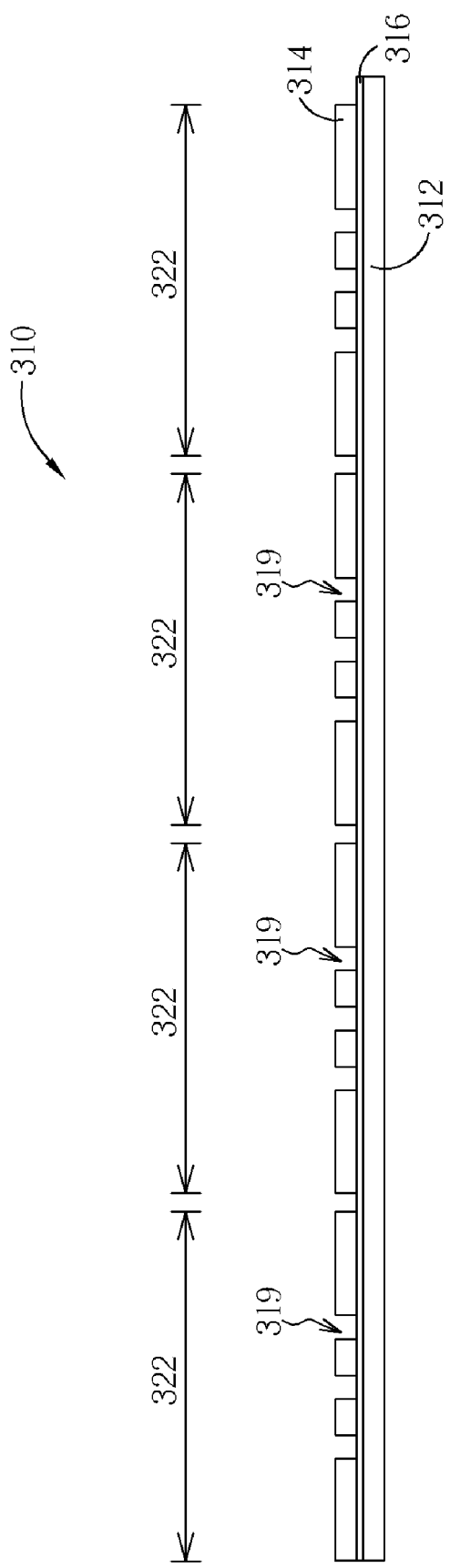
Figure 7:
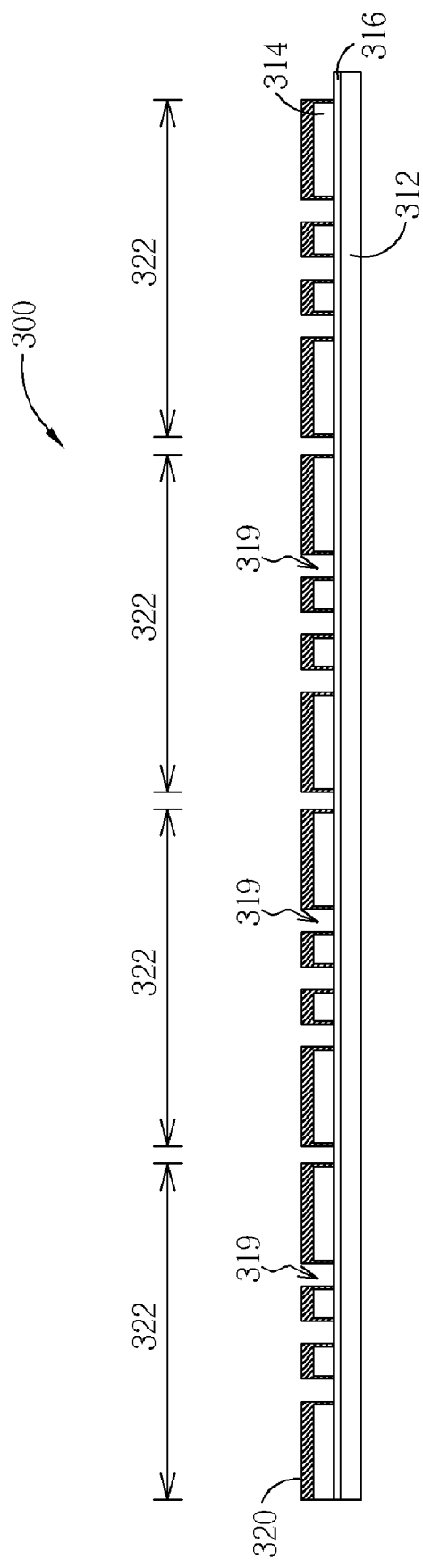

As shown in FIG. 3, the fabrication of the bipolar plate 300 comprises providing a substrate, which includes a releasable copper carrier 312, providing a metal foil 314 disposed on top of the releasable copper carrier 312, and providing a release layer 316 that functions to bind the releasable copper carrier 312 and the metal foil 314 together. The metal foil 314 can be comprised of a plurality of copper plates. As shown in FIG. 4, a photoresist 318 is layered on the metal foil for defining an electrode plate area 322. Next, a copper etching process is performed as shown in FIG. 5 to etch the area of the metal foil 314 not covered by the photoresist 318 for forming a recess 319. Next, the photoresist 318 is removed as shown in FIG. 6. In order to prevent oxidation caused by direct contact between the electrode plate area 322 and the methanol fuel, a protective layer 320 is coated on the electrode plate area 322, in which the protective layer 320 can be a carbon ink layer or a layer comprised of gold.

Figure 8:
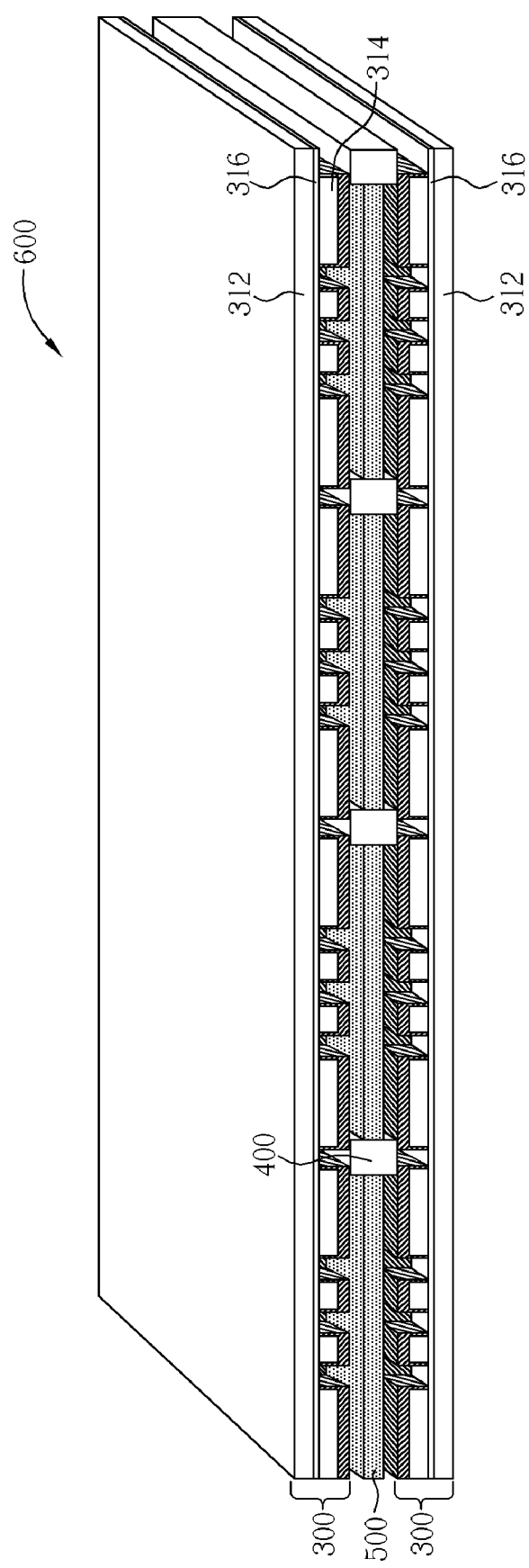
FIG. 8 to FIG. 11 are diagrams showing the method for fabricating the bipolar/MEA assembly of the DMFC according to the present invention.

Please refer to FIG. 8 to FIG. 11. FIG. 8 to FIG. 11 are diagrams showing the method for fabricating the bipolar/MEA assembly 600 of the DMFC according to the present invention. As shown in FIG. 8, a laminating process is performed for binding the two bipolar plates 300, the bonding sheet 400, and the MEA 500 together. As discussed previously, the bipolar plate 300 can be fabricated by the process shown from FIG. 3 to FIG. 7, whereas the MEA 500 can be obtained from the Nafion membrane electrode assembly of DuPont Corp, or any other solid state membrane electrode assembly with similar functions. In addition, the bonding sheet is comprised of a "prepreg" material commonly utilized in the B-stage of a printed circuit board (PCB) fabrication, which is capable of reaching a complete polymerization and curing state under a predetermined temperature treatment, preferably 70 to 120° C. or lower, for 30 to 120 minutes. The bonding sheet 400 also includes a plurality of openings (not shown), in which the size of the openings is just about enough to contain the MEA 500.

Figure 9:
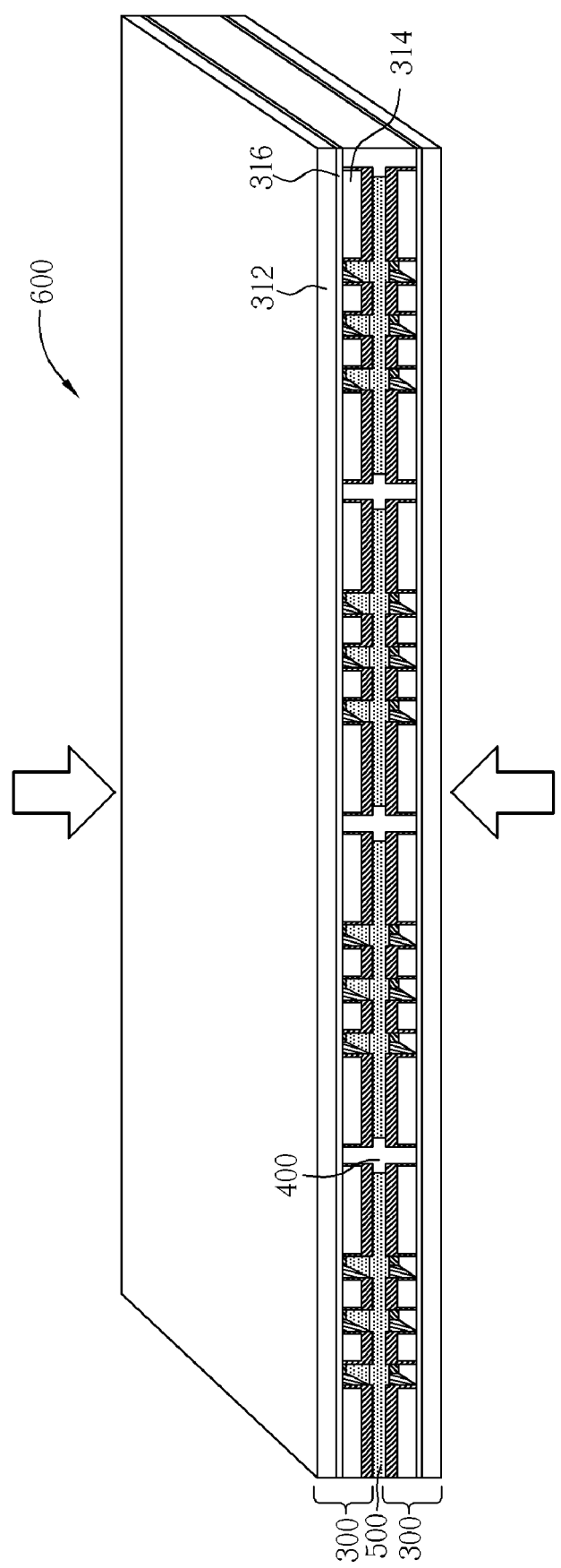

As shown in FIG. 9, the metal foils 314 of the two bipolar plates 300 are laminated with the bonding sheet 400 and the MEA 500. Since the thickness of the MEA 500 is likely to decrease after the laminating process is completed, the thickness of the bonding sheet 400 should be greater than or equal to the thickness of the MEA 500 after it has been laminated for completely binding to the metal foil 314. In general, the thickness of the MEA 500 is around 0.8 mm before the lamination and 0.6 mm after the lamination, hence the bonding sheet 400 should be at least 0.6 mm in thickness. Nevertheless, the thickness of the bonding sheet 400 may still vary due to the variation of the MEA 500.

Figure 10:
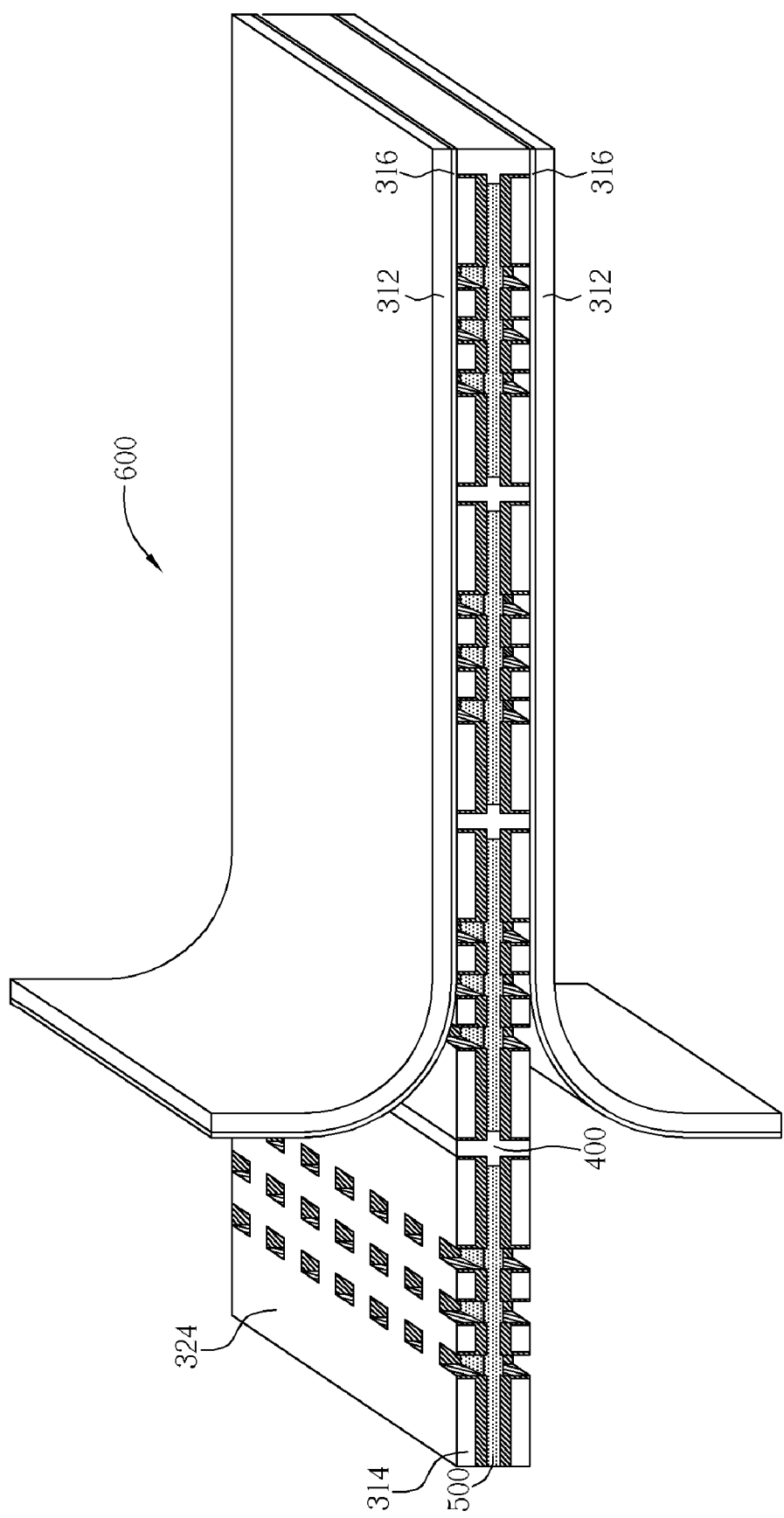
Figure 11:
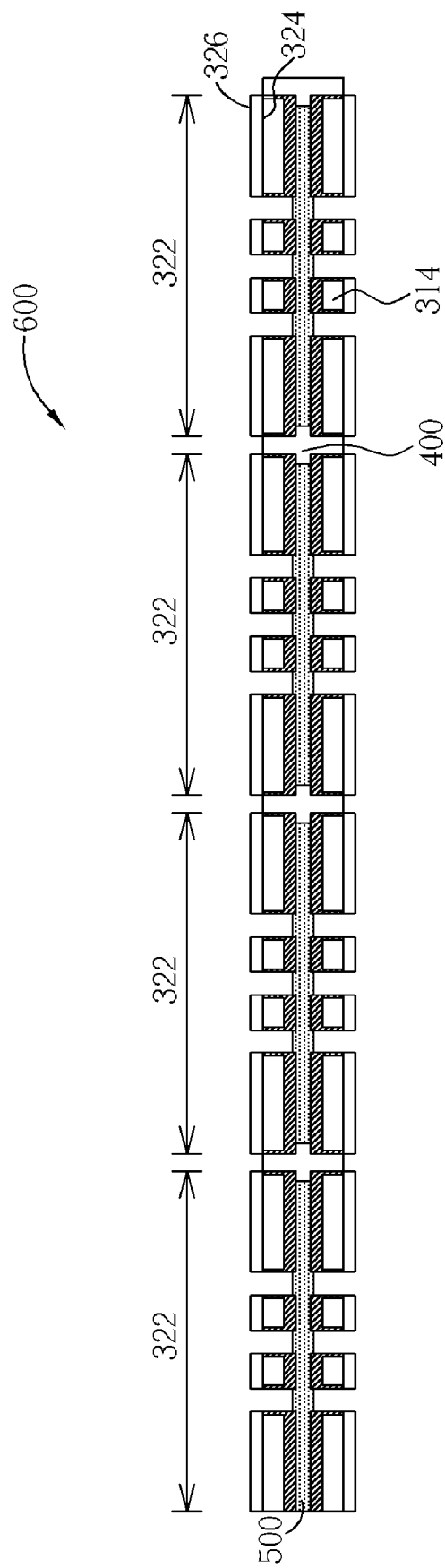
Figure 12:
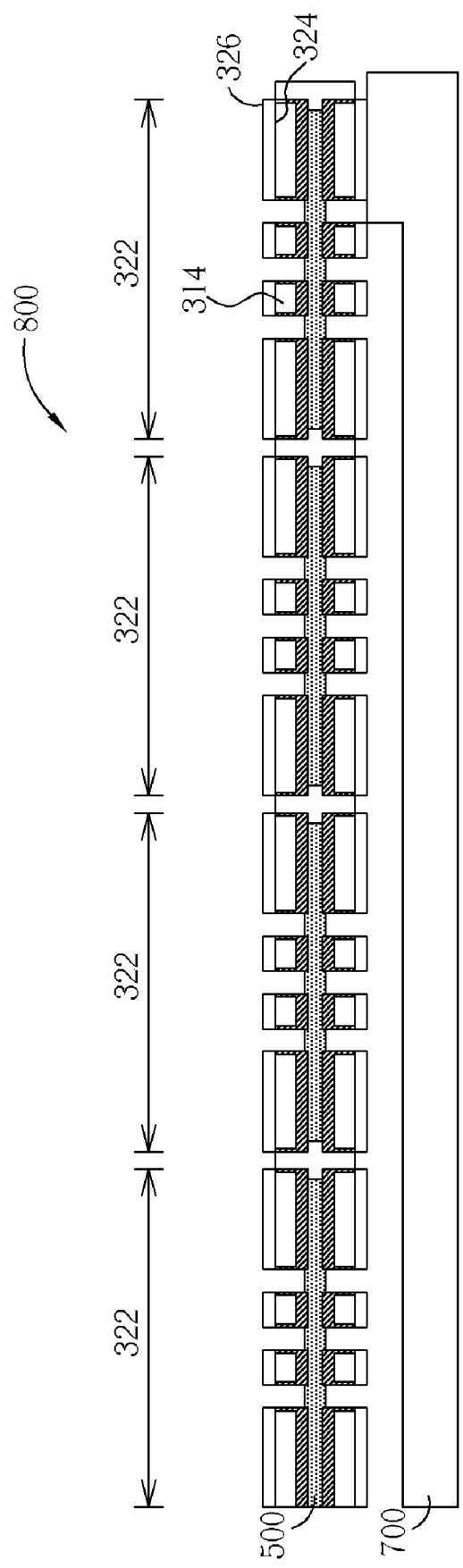
FIG. 12 is a perspective view of the DMFC according to the present invention.

As shown in FIG. 10, after the releasable copper carrier 312 and the release layer 316 are removed after the laminating process, the remaining metal foil 314 of the bipolar plates 300 is tightly connected with the MEA 500 and together with the bonding sheet 400, forming a bipolar/MEA assembly 600. Next, as shown in FIG. 11, a copper surface 324 of the metal foil is exposed as a result of the removal of the releasable copper carrier 312 and the release layer 316. A protective layer 326 is then disposed on the copper surface 324, in which the protective layer can be a carbon ink layer or comprised of materials such as gold. Lastly, as shown in FIG. 12, the bipolar/MEA assembly 600 is connected with a fuel container base 700 for forming a DMFC 800.

In contrast to the prior art, the improved DMFC of the present invention has the following advantages:

(a) The bipolar plate 300, being the critical component of the fuel cell, is fabricated by a PCB-like technique, and a releasable substrate is also utilized for further lowering the fuel cell cost.

(b) The bipolar plate 300 of the fuel cell, being fabricated by a multilayer process, is capable of achieving a scale of mass production.

(c) Instead of bending the wire laths manually as in the prior art, the bipolar plate 300 is utilized in the present invention for achieving mass production and more precise assembly.

(d) By utilizing a printed circuit board manufacture technique, the integrated circuits of various lithium batteries and fuel cells used for controlling portable electronic devices can also be integrated into a printed circuit board, thereby reducing the size of the cell and also increasing its value and effectiveness.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for fabricating a bipolar plate of a DMFC (direct methanol fuel cell) comprising:

providing a substrate consisting of a releasable carrier having a first side and a second side, a release layer on the first side, and a single metal foil merely disposed on the release layer, in which the release layer functions to bind the releasable carrier and the metal foil together;

forming a photoresist pattern defining an electrode plate area on the metal foil;

performing an etching process, using the photoresist pattern as a hard mask, to etch the metal foil, thereby forming the electrode plate area on the release layer, wherein the etching process stops on the release layer, and wherein the electrode plate area comprises a plurality of openings extending through thickness of the metal foil, which allows air or fuel to contact with a membrane electrode assembly (MEA) to be mounted on the electrode plate area;

removing the photoresist pattern;

disposing a protective layer on the electrode plate area;

after disposing the protective layer, laminating the substrate on a bonding sheet encompassing the MEA; and simultaneously ripping off the releasable carrier and the release layer, leaving the electrode plate area inlaid in the bonding sheet and in contact with the MEA.

2. The method of fabricating a bipolar plate of a DMFC of claim 1, wherein the metal foil is a copper foil.

3. The method of fabricating a bipolar plate of a DMFC of claim 1, wherein the protective layer is a carbon ink layer.

4. The method of fabricating a bipolar plate of a DMFC of claim 1, wherein the protective layer is comprised of gold.

5. The method of fabricating a bipolar plate of a DMFC of claim 1, wherein the protective layer is formed for preventing oxidation caused by contact between the electrode plate area and methanol fuel.

* * * * *